US008515857B2

(12) United States Patent
Lutnick et al.

(10) Patent No.: US 8,515,857 B2
(45) Date of Patent: Aug. 20, 2013

(54) ELECTRONIC SECURITIES MARKETPLACE HAVING INTEGRATION WITH ORDER MANAGEMENT SYSTEMS

(75) Inventors: Howard W. Lutnick, New York, NY (US); Mark Miller, New York, NY (US); Dean P. Alderucci, New York, NY (US); Bill Rice, Los Angeles, CA (US); Kevin Foley, New York, NY (US); Andrew Fishkind, New York, NY (US); Philip Marber, New York, NY (US); Brian Gay, New York, NY (US)

(73) Assignee: CFPH, LLC, New York, NY (US)

( * ) Notice: Subject to any disclaimer, the term of this patent is extended or adjusted under 35 U.S.C. 154(b) by 56 days.

(21) Appl. No.: 13/330,018

(22) Filed: Dec. 19, 2011

(65) Prior Publication Data

US 2012/0095900 A1     Apr. 19, 2012

Related U.S. Application Data

(63) Continuation of application No. 12/113,602, filed on May 1, 2008, now Pat. No. 8,082,205.

(51) Int. Cl.
*G06Q 40/00* (2012.01)

(52) U.S. Cl.
USPC .............................. 705/37; 705/36 R; 705/35

(58) Field of Classification Search
USPC ..................................................... 705/35–37
See application file for complete search history.

(56) References Cited

U.S. PATENT DOCUMENTS

| | | | |
|---|---|---|---|
| 5,950,177 A | 9/1999 | Lupien et al. | |
| 5,963,923 A | 10/1999 | Garber | |
| 6,098,051 A | 8/2000 | Lupien et al. | |
| 6,134,535 A | 10/2000 | Belzberg | |
| 6,282,521 B1 | 8/2001 | Howorka | |
| 6,343,278 B1 | 1/2002 | Jain et al. | |
| 6,377,940 B2 | 4/2002 | Tilfors et al. | |
| 6,938,011 B1 | 8/2005 | Kemp et al. | |
| 6,952,683 B1 | 10/2005 | Gerhard | |
| 7,047,218 B1 | 5/2006 | Wallman | |
| 7,127,424 B2 | 10/2006 | Kemp, II et al. | |
| 7,136,834 B1 | 11/2006 | Merrin et al. | |
| 7,155,410 B1 | 12/2006 | Woodmansey et al. | |
| 7,308,428 B1 | 12/2007 | Federspiel | |
| 7,356,500 B1 | 4/2008 | Waelbroeck | |
| 7,392,214 B1 | 6/2008 | Fraser et al. | |
| 7,428,506 B2 | 9/2008 | Waelbroeck | |
| 7,533,052 B2 | 5/2009 | Tilfors et al. | |
| 7,565,313 B2 | 7/2009 | Waelbroeck | |

(Continued)

FOREIGN PATENT DOCUMENTS

| | | |
|---|---|---|
| JP | H11-504455 | 4/1999 |
| JP | 2004-46884 | 2/2004 |

(Continued)

OTHER PUBLICATIONS

U.S. Appl. No. 13/170,817, filed Jun. 28, 2011.

(Continued)

*Primary Examiner* — Hani M Kazimi

(57) ABSTRACT

An electronic trading marketplace (ETM) communicates with interfacing modules interfacing directly with order management systems (OMS's) at trading institutions. The interfacing modules automatically transmit orders from the OMS databases to the ETM and update the OMS databases in response to orders executed at the ETM. Traders can communicate with the ETM to anonymously negotiate trades of securities.

23 Claims, 8 Drawing Sheets

(56) References Cited

U.S. PATENT DOCUMENTS

| | | |
|---|---|---|
| 7,680,715 B2 | 3/2010 | Waelbroeck |
| 7,685,052 B2 | 3/2010 | Waelbroeck |
| 7,747,515 B1 | 6/2010 | Merrin et al. |
| 7,778,919 B2 | 8/2010 | Waelbroeck |
| 7,814,000 B2 | 10/2010 | Waelbroeck |
| 7,827,089 B2 | 11/2010 | Sweeting et al. |
| 7,865,425 B2 | 1/2011 | Waelbroeck |
| 7,870,059 B2 | 1/2011 | Waelbroeck |
| 7,870,062 B2 | 1/2011 | Waelbroeck |
| 7,877,318 B2 | 1/2011 | Waelbroeck |
| 7,882,013 B2 | 2/2011 | Shapiro |
| 7,882,014 B2 | 2/2011 | Shapiro |
| 7,882,015 B2 | 2/2011 | Waelbroeck |
| 7,904,376 B2 | 3/2011 | Shapiro |
| 7,908,203 B2 | 3/2011 | Shapiro |
| 7,908,205 B2 | 3/2011 | Waelbroeck |
| 7,908,206 B2 | 3/2011 | Waelbroeck |
| 7,917,425 B2 | 3/2011 | Waelbroeck |
| 7,996,261 B1 | 8/2011 | Waelbroeck |
| 8,010,438 B2 | 8/2011 | Waelbroeck |
| 8,024,253 B2 | 9/2011 | Peterffy et al. |
| 8,041,628 B2 | 10/2011 | Waelbroeck |
| 8,069,106 B2 | 11/2011 | Waelbroeck |
| 8,095,455 B2 | 1/2012 | Shapiro |
| 8,095,456 B2 | 1/2012 | Waelbroeck |
| 8,103,579 B1 | 1/2012 | Berkeley |
| 8,108,299 B1 | 1/2012 | Waelbroeck et al. |
| 8,165,954 B2 | 4/2012 | Waelbroeck et al. |
| 8,266,045 B2 | 9/2012 | Waelbroeck et al. |
| 8,306,904 B1 | 11/2012 | Marchini |
| 2002/0095364 A1 | 7/2002 | Russell et al. |
| 2002/0099642 A1 | 7/2002 | Schwankl et al. |
| 2002/0143689 A1 | 10/2002 | Naylor et al. |
| 2002/0169703 A1 | 11/2002 | Lutnick et al. |
| 2003/0154157 A1 | 8/2003 | Kokis et al. |
| 2004/0034591 A1 | 2/2004 | Waelbroeck et al. |
| 2004/0143539 A1 | 7/2004 | Penney et al. |
| 2004/0177025 A1 | 9/2004 | Spoonhower et al. |
| 2004/0215549 A1 | 10/2004 | Madhavan et al. |
| 2005/0027638 A1 | 2/2005 | Ng et al. |
| 2005/0187854 A1 | 8/2005 | Cutler et al. |
| 2006/0229970 A1 | 10/2006 | Anderson et al. |
| 2006/0259414 A1 | 11/2006 | Singer et al. |
| 2008/0262957 A1 | 10/2008 | Ford |
| 2009/0018945 A1 | 1/2009 | Ford |
| 2009/0089199 A1 | 4/2009 | Waelbroeck |
| 2009/0094151 A1 | 4/2009 | Mortimer |
| 2009/0259584 A1 | 10/2009 | Waelbroeck |
| 2010/0017323 A1 | 1/2010 | Zimmerman |
| 2010/0094775 A1 | 4/2010 | Waelbroeck |
| 2010/0121759 A1 | 5/2010 | Waelbroeck et al. |
| 2010/0153304 A1 | 6/2010 | Waelbroeck et al. |
| 2012/0011051 A1 | 1/2012 | Waelbroeck |
| 2012/0095901 A1 | 4/2012 | Berkeley, III |

FOREIGN PATENT DOCUMENTS

| | | |
|---|---|---|
| JP | 2004-537769 | 12/2004 |
| WO | WO96/34357 | 10/1996 |
| WO | WO02/29686 | 4/2002 |
| WO | WO02/093326 | 11/2002 |

OTHER PUBLICATIONS

US PTO Office action for U.S. Appl. No. 12/477,523; Jun. 4, 2012; 9 pages.

Notice of Allowance for U.S. Appl. No. 12/477,549; Apr. 17, 2012; 21 pages.

JP Office Action for Application No. 2008-512581 dated Nov. 8, 2011; 4 pages (including English Translation).

AU Examination Report for Application No. 2006251674 dated Feb. 9, 2011; 2 pages.

EP Extended Search Report for Application No. 06760245.8 dated Oct. 30, 2009; 7 pages.

Search Report and Written Opinion for PCT/US06/19640; 6 pages; Nov. 13, 2007.

Notice of Allowance and Examiner Interview Summary Record for U.S. Appl. No. 12/477,549; Aug. 14, 2012; 18 pages.

US PTO Office Action for U.S. Appl. No. 11/133,767; Apr. 17, 2012; 30 pages.

US PTO Office Action for U.S. Appl. No. 11/133,767; Oct. 9, 2008; 16 pages.

US PTO Office Action for U.S. Appl. No. 11/133,767; Mar. 14, 2011; 24 pages.

US PTO Office Action for U.S. Appl. No. 11/133,767; Aug. 13, 2009; 18 pages.

US PTO Office Action for U.S. Appl. No. 11/133,767; Jun. 23, 2010; 20 pages.

US PTO Office Action for U.S. Appl. No. 13/234,147; Oct. 1, 2012; 9 pages.

EP Examination Report for Application No. 06760245.8 dated Feb. 13, 2002; 4 pages.

JP Office Action for Application No. 2008-512581 dated Sep. 19, 2012; 6 pages (including English Translation).

US Notice of Allowance for U.S. Appl. No. 11/133,767 dated Jan. 4, 2013; 11 pages.

US PTO Office action for U.S. Appl. No. 12/477,523; Sep. 22, 2011; 6 pages.

US PTO Office action for U.S. Appl. No. 12/477,549 filed Sep. 22, 2011; 6 pages.

| 410 | 412 | 414 | 416 | 418 | 420 | 422 | 424 | 426 | 428 | 430 |
|---|---|---|---|---|---|---|---|---|---|---|
| ORDER ID | TRADER ID | ORDER STATUS | ORDER LAST UPDATE TIME | TRANSACTION TYPE | SECURITY SYMBOL | SECURITY TYPE | ORDER TYPE | LIMIT PRICE | TOTAL ORDER SIZE | QUANTITY PLACED ELSEWHERE |

ELECTRONIC SECURITIES MARKETPLACE HAVING INTEGRATION WITH ORDER MANAGEMENT SYSTEMS

CROSS-REFERENCE TO RELATED APPLICATION

This patent application is a continuation application of U.S. patent application Ser. No. 12/113,602, filed May 1, 2008 now U.S. Pat. No. 8,082,205, which is hereby incorporated by reference herein in its entirety.

BACKGROUND

1. Field of the Invention

The present invention relates in general to securities trading and in particular to electronic commerce marketplaces and order management systems for supporting securities trading.

2. Background Art

Although computers are heavily used to facilitate trading of securities, manual intervention may still be required at certain steps in the trading process. For example, most traders at institutional investment management firms record their orders to purchase or sell securities in computerized order management systems (OMS's). However, one or more traders at each firm may manually review the orders in the OMS and attempt to fill the orders by contacting one or more market intermediaries. Typically, the traders transmit the orders in the OMS by telephone or separate data entry links to registered broker-dealers for the securities, to electronic marketplaces that trade the securities, or to other market intermediaries. Accordingly, manual effort is often required to actually execute the orders in the OMS.

One problem arising from this manual effort is that institutional traders may be unable to execute trades involving large quantities of securities without adversely affecting the market price of the securities. For example, institutional traders often need to trade large quantities of securities due to the continuing need of investment managers to respond to changes in market conditions by altering the contents of their investment portfolios. As these portfolios increase in size due to increased investor activity, the corresponding quantity of securities to be traded in order to achieve a similar portfolio balance also increases. Market impact costs, or adverse costs resulting from the institutional traders' activities, rise in such circumstances because locating parties with whom to trade such large quantities of securities becomes more difficult for the market intermediaries.

Moreover, if the market intermediaries become aware that an institutional firm wants to, say, sell a large block of a particular equity security, this awareness is likely to lower the sale price that the institutional firm can obtain due to the normal processes of supply and demand. The effect is also likely to be exacerbated by speculation from others with knowledge of the order as to why the particular investor wishes to sell such a large quantity of the security. Similarly, if market intermediaries become aware of the fact than an institutional firm wants to buy a large block of a particular equity security, this awareness will likely increase the purchase price that the institutional firm will have to pay. This adverse effect on price is further exacerbated by the fact that traditional market intermediaries trade for their own accounts.

One strategy commonly employed by institutional traders to offset market impact costs is to spread out trade orders for a large quantity of a security into small orders each handled by a different market intermediary, sometimes over several trading days. Of course, this strategy brings about its own problems in that the market price can change significantly during this extended trading period due to the unforeseeable activities of others.

Another strategy that may be employed is to spread the orders for the security among one or more electronic marketplaces. However, the traders may need to manually transmit each order to the electronic marketplaces using a telephone or a separate data entry link. The fact that the traders may need to perform these extra steps, which include duplicate entry of basic order data already recorded in the OMS, causes many traders to use these electronic marketplaces infrequently, and to supply the marketplaces with only a small subset of the total orders. As a result, these electronic marketplaces often lack the liquidity required by a trader to timely execute orders.

The lack of integration between the OMS and the electronic marketplaces also poses problems when an institutional trader wishes to trade a particular security simultaneously within an electronic marketplace and, for example, over the telephone with a traditional broker. For example, some electronic marketplaces attempt to find matches at only specific time intervals. If a trader wishes to buy 100,000 shares of IBM, and has placed an order for half that amount in an electronic marketplace, the trader will not know how much, if any, IBM stock was purchased until after the next scheduled match attempt. In the meantime, the trader potentially could have purchased more than 50,000 shares from a broker over the phone at a better price.

Therefore, there is a need in the art for an electronic trading marketplace that does not require a significant amount of manual intervention by traders or other parties, offers anonymity, and offers a high amount of liquidity.

SUMMARY

Some embodiments address the above need by providing for the automated transmission of orders (i.e., without manual trader intervention) from the various order management systems (OMS's) used by investment management firms or other entities having trading systems to an electronic trading marketplace (ETM). A firm with a trading system stores information about orders in an OMS to manage its order flow, to monitor the initiation, placement, and execution of orders, and for related purposes. Software providing the functionality of an OMS is well known in the art.

OMS interfacing modules (OIMs) at the firms may automatically transmit orders from the OMS's to the ETM and preferably update the OMS's in response to orders executed at the ETM. Traders can communicate with the ETM to anonymously negotiate trades of securities. As used herein, a "security" is an ownership or creditorship interest, such as a stock certificate, bond, or any other financial instrument, contract or transaction, such as a forward, futures, option, put, call, collar, swap, or currency contract on any security. This description uses the term "security" for convenience but it should be understood that the term covers financial instruments generally. It should also be understood that other embodiments may be used for trading of other goods and/or services.

The ETM may include an OMS data integration module (ODIM) for receiving and processing data representative of orders received from the OIMs. In a preferred embodiment, the data from the OIMs are provided to the ETM in a standardized format that requires little processing by the ODIM. The orders processed by the ODIM may be stored in an ETM database.

A negotiation module in the ETM may support negotiations between traders. In one embodiment, an indications module transmits orders received by the ETM among the traders based upon filtering criteria established by the traders and/or the ETM. These orders are transmitted among the traders in the form of non-binding indications. Based upon these indications, traders at one institution can enter into negotiations with traders at other institutions, through the negotiation module of the ETM. In one embodiment, at least parts of the negotiations are conducted anonymously.

A trader authentication module may authorize and/or authenticate traders who log into the ETM in order to perform trading negotiations and/or other functions. A transaction history module may record transactions performed by the ETM in the ETM database. The transaction history module also preferably records other data processed by the ETM including, for example, the orders received from and sent to the trading systems and the conducted negotiations.

A typical trading system at an investment management firm or other entity at which trading is performed includes a number of workstations coupled to an OMS server via a network, with a trader at each workstation. Each workstation preferably executes a trader OMS interaction module (TOIM) for facilitating interactions between the trader's workstation and the OMS server. In one embodiment of the present invention, the TOIM allows a trader to add, delete, or modify open or contemplated orders stored in the OMS database. The OMS, which includes the OMS server, OMS database, and TOIM, is typically provided by an OMS vendor, though some firms have developed their own OMS's.

In connection with the present invention, each workstation also preferably executes an ETM interaction module (EIM) for facilitating interactions with the ETM. The EIM allows a trader to send information to the ETM and view and respond to information received from the ETM. Typically, this information includes information about the trader's indications, information about other traders' indications, and orders transmitted to and received by a trader during a negotiation.

The OMS database holds data representative of open, contemplated, and/or completed orders to buy and/or sell securities by traders using the trading system. The OIM is in communication with the OMS database and the ETM. An OMS database integration module in the OIM may read data records stored in the OMS database and, in a preferred embodiment, also creates and modifies data records stored in the OMS database upon execution of a trade through the ETM. In one embodiment, the OMS database interaction module directly accesses the OMS database and in another embodiment it sends commands to an application programming interface (API) in the OMS for accessing the database.

The OIM may include an ETM communication module for communicating with the ETM. In one embodiment, the ETM communication module provides selected data records in the OMS database to the ETM and, in a preferred embodiment, receives data and/or instructions from the ETM regarding changes to make to the OMS database. In addition, the OIM preferably includes a data record conversion module for modifying the format of data records sent to the ETM and/or received from the ETM. The OIM also preferably includes a filtering module for filtering out specified orders by security type, security name, order type, order price, order quantity, or other category, so that those orders are not transmitted to the ETM.

In some embodiments, the OIM or some other component may include a reasoning module. Such a reasoning module may determine why a particular order is present in an OMS database (e.g., by asking a trader entering the order, by receiving such information from a trader, by searching strategy information that also may be stored by an OMS, by analyzing trading behavior, by receiving information from a risk model associated with a trader, etc.). In some embodiments, the reasoning module may be used to suggest and/or enter orders for securities that fulfill reasons for other orders being present. Such functionality may be useful if an order would otherwise go unfulfilled and a reasonable alternative security is available.

Preferably, the OIM transmits to the ETM data records in the OMS database relating to a trader's orders when the trader logs on to the ETM. Once the OIM determines that the trader has logged on to the ETM, the OIM retrieves data records about that trader's orders suitable for transmission to the ETM from the OMS database. In one embodiment, the OIM converts the data records retrieved from the OMS database into a standardized format understood by the ETM. In another embodiment, this functionality is part of the ETM.

After a trader has logged on to the ETM, the OIM determines whether the contents of the OMS database have changed. If the OMS database has changed, the OIM determines whether the change should be transmitted to the ETM. In one embodiment, the OIM continues to determine whether the contents of the OMS database have changed between the time that a trader logs on to the ETM and the time that the ETM commences trading. In another embodiment, the OIM does not commence making this determination until the time that the ETM commences trading.

Because typical OMS's are complex and multi-featured, and because securities of types not handled by the ETM may be traded using the OMS, some changes to the OMS database do not necessitate a transmission of updated data to the ETM. The OIM preferably transmits changes to the database to the ETM if the changes represent new or modified orders.

The OIM preferably updates the database in response to information received from the ETM indicating executed trades or other information. In a preferred embodiment, if an execution occurred in the ETM involving an order in the OMS associated with the OIM, the OIM receives information from the ETM describing the execution. This information includes, for example, the type, amount, and price of securities traded, the time of execution, and/or information identifying the original order in the OMS database on which the execution was based. The OIM converts the received information about the execution into the format used by the OMS and updates the OMS database accordingly. As a result of these steps, the OMS is updated automatically and transparently to reflect executions performed at the ETM. The executions appear to the OMS as typical trades conducted at another broker, so no special functionality needs to be added to the OMS in order to interact with the ETM beyond that functionality described herein.

Although several embodiments may be described as involving "traders" it should be recognized that other embodiments may not involve traders in all the same ways as described or at all. Rather than involving traders in negotiations, entering of trades in an OMS, and/or other actions, some embodiments may be automated through a trading algorithm. Such a trading algorithm may control the entry of traders, the negotiation of deals, and/or any other actions that would traditionally be controlled by one or more traders at a trading institution.

BRIEF DESCRIPTION OF THE DRAWINGS

FIG. 4 is a diagram illustrating a data record stored in the order management system (OMS) database to identify an order according to one embodiment of the present invention;

DETAILED DESCRIPTION

U.S. Pat. No. 7,136,834 to Merrin (hereinafter, "Merrin"), et al. is hereby incorporated herein by reference in its entirety, including, the specification of Merrin, the prosecution file history of Merrin, and any other material that provides meaning to any portion of the patent. Accordingly, terms that have a meaning in Merrin (e.g., based on the specification, based on the prosecution file history, based on other material that provides a meaning to the any portion of the patent, etc.) are intended to have the same meaning herein. Thus, the person of ordinary skill in the art would understand terms used in Merrin and used herein to have the same meaning.

Figure 1:
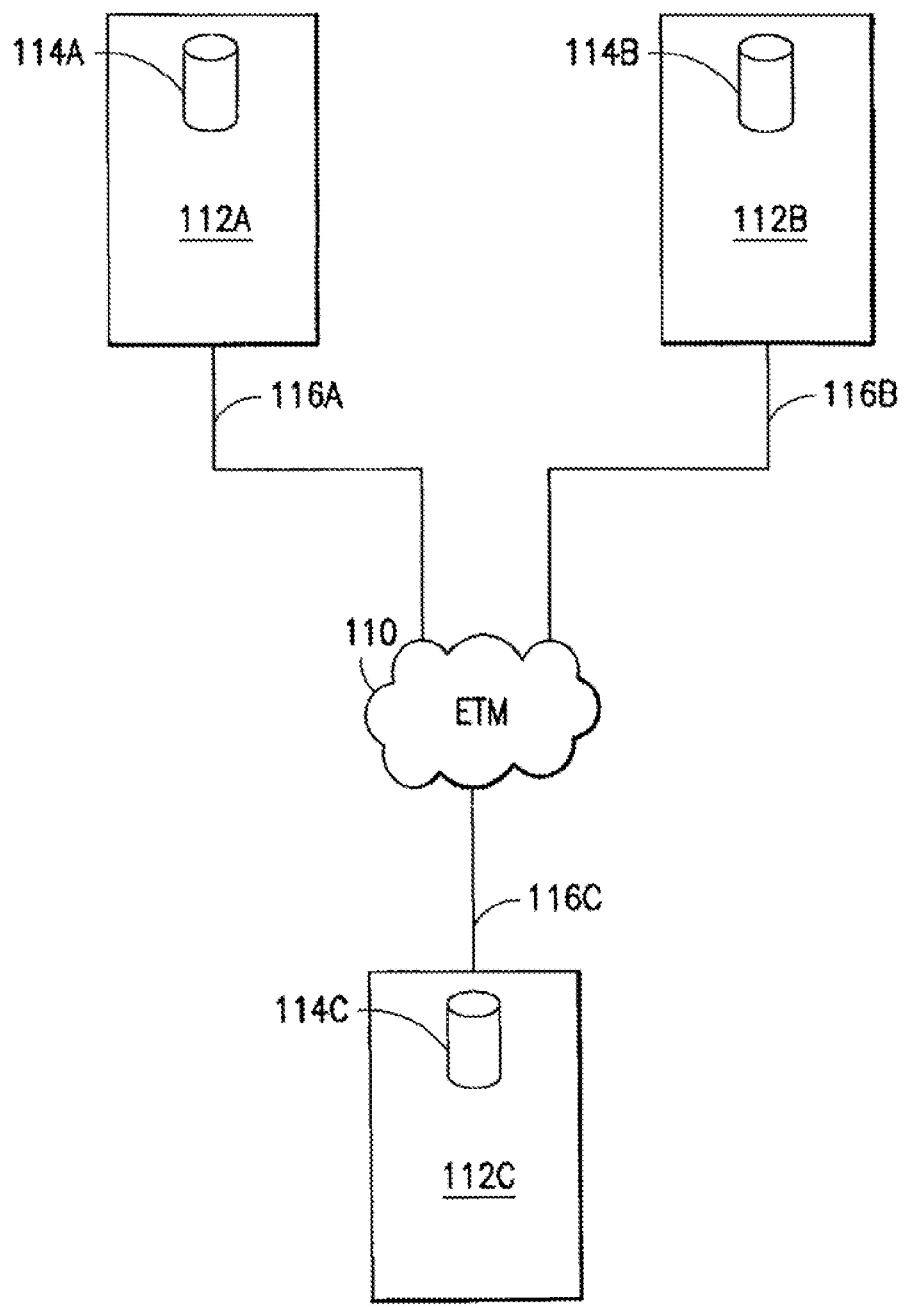
FIG. 1 is a high-level block diagram illustrating an electronic trading marketplace (ETM) environment according to an embodiment of the present invention.

FIG. 1 is a high-level block diagram illustrating an electronic trading marketplace (ETM) environment according to an embodiment of the present invention. An ETM 110 is in communication with three trading systems 112A, 112B, 112C. Although only three trading systems 112 are illustrated, embodiments of the present invention can have many more (or fewer) trading systems 112 in communication with the ETM 110. FIG. 1 illustrates only three trading systems 112 in order to enhance the clarity of this description.

In some embodiments, an ETM may be configured to couple to other ETMs and/or other marketplaces. For example, one particular ETM may be configured to facilitate trades between traders coupled to the particular ETM. That particular ETM may, in some circumstances (e.g., if no counter parties for a particular order is available at the particular ETM) may transmit information about orders to another ETM to try to find counter parties through that other ETM. Accordingly, one ETM may be able to avail itself of orders/traders associated with other ETMs. Transmitting order information to other ETMs may be performed after asking a trader associated with a particular order if such transmission is acceptable and/or according to a previously established trading preference of a particular trader. In some embodiments, different ETMs may be configured to trade different things. For example, one ETM may be configured to trade stocks, and another ETM may be configured to trade derivatives. The coupling of such ETMs configured to trade different things may be particularly useful in embodiments configured to offer additional products and/or services to traders based on knowledge regarding orders submitted by traders, as discussed in more detail below.

The trading systems 112A, 112B, 112C are used by investment management firms or other entities that have established a relationship with the ETM 110. The trading systems 112 communicate with the ETM 110 to facilitate the trading of securities. As used herein, a "security" is any ownership or creditorship interest, such as a stock certificate or bond, or any other financial instrument, contract, or transaction, such as a forward, futures, option, put, call, collar, swap, or currency contract. This definition includes, for example, any note, stock, bond, debenture, certificate of interest or participation in any profit-sharing agreement or in any oil, gas, or other mineral royalty or lease, any collateral trust certificate, investment contract, voting-trust certificate, certificate of deposit, any put, call, straddle, option, or privilege on any of the foregoing, or group or index of securities (including any interest therein or based on the value thereof). This list is not all-inclusive. For purposes of clarity, this description will describe the trading of stock.

Within each trading system 112 is a database 114A, 114B, 114C associated with an order management system (OMS). Each OMS database 114 holds data representative of open, contemplated, and/or completed orders to buy and/or sell securities (collectively referred to herein as "orders for securities") by traders using the trading system 112. For example, assume that the database 114A of trading system 112A contains orders to sell 50,000 shares of DELL and 75,000 shares of MSFT and orders to buy 25,000 shares of CPQ and 100,000 shares of IBM. Also assume that the database 114B of trading system 112B contains orders to sell 30,000 shares of CPQ and buy 62,000 shares of T.

The orders in the OMS databases 114 may be automatically transmitted to the ETM 110. Likewise, any changes in the orders, such as modifications and/or withdrawals, may be automatically transmitted to the ETM 110. As used herein, the term "automatically" means that the associated action is performed without any human or manual intervention. Thus, there is no need for traders to specifically request that individual orders in the OMS databases 114 are transmitted to the ETM 110; orders in the databases are sent to the ETM 110 without the traders' input (subject to filtering criteria).

In some embodiments, orders in OMS databases may not be automatically transmitted to the ETM 110. Rather, traders may individually select orders from an OMS database to be transmitted to the ETM 110. Because some trading firms may fear that information about some of the orders stored within their OMS databases may be used maliciously if that information is revealed, using such selective transmission rather than automatic transmission may enable trading firms to keep particularly sensitive order information from being transmitted while allowing less sensitive order information to be transmitted.

Preferably, the ETM 110 anonymously transmits information about a trader's orders to other traders using the ETM, subject to filtering in accordance with filtering criteria established by the traders and/or the ETM. Moreover, the ETM 110 preferably manages anonymous negotiations between traders using the trading systems 112 for the purpose of executing the orders and sends data about the completed trades to the OMS's of the traders involved in the transaction.

Thus, one embodiment of the present invention selectively broadcasts information about the orders received by the ETM 110 from the database 114A of trading system 112A to the other trading systems 112B, 112C. Likewise, the ETM 110 selectively broadcasts information about the orders received from the database 114B of trading system 112B to the other trading systems 112A, 112C. If the traders desire such a trade, the ETM 110 will facilitate the anonymous negotiation and sale of 25,000 shares of CPQ from a trader using trading system 112B to a trader using trading system 112A.

In some embodiments, an order from a first trader may be narrowcast to potential counter parties. To determine which other traders are potential counter parties, the ETM may match the order from the first trader with orders received from other traders (e.g., by security name, type, order size, price, etc.). If matching orders are available from other traders, those traders may be identified as potential counter parties and information about the order from the first trader may be transmitted to those traders.

Data may be communicated between the trading systems 112 and the ETM 110 using interfacing links 116A, 116B, 116C. Any known interfacing technologies can be used to effectuate these links, including, but not limited to, transmission control protocol/Internet protocol (TCP/IP), satellite, cellular, and/or radio frequency (RF) links, or some combination thereof. The links may pass through one or more intermediate data processing systems, such as telephone switches or Internet servers, before reaching the ETM 110 or a trading system 112. In embodiments where data travels over shared links, such as embodiments where data travels over the public Internet, the data is preferably encrypted using a secure protocol, such as the secure sockets layer (SSL).

Figure 2:
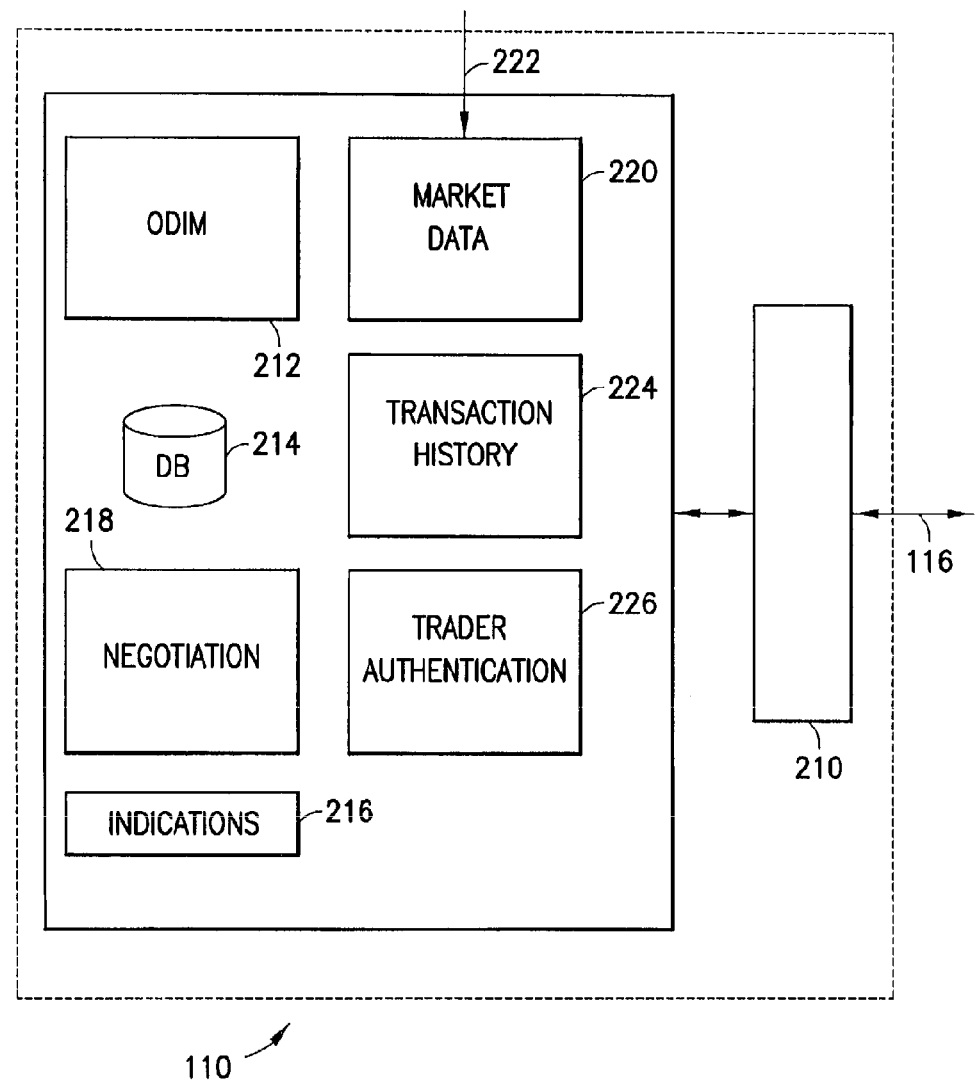
FIG. 2 is a high-level block diagram illustrating more details of the ETM.

FIG. 2 is a high-level block diagram illustrating more details of the ETM 110. Those of skill in the art will recognize that FIG. 2 illustrates only one possible embodiment of the ETM 110. Obviously, different combinations of hardware and software can be used to provide the functionality of the ETM 110 described herein.

Data received by the ETM 110 from the trading systems 112 over the interfacing links 116 may be received by a firewall 210. As is known in the art, the firewall 210 preferably prevents unauthorized users from gaining access to the rest of the ETM 110 and monitors transfers of data to and from the network.

Data that pass through the firewall 210 may be received by one or more modules that perform the functionality of the ETM 110. As used herein, the term "module" refers to machine-executable code and/or data, but may also include associated circuitry, such as processing circuitry, as well as data storage areas, and/or any other software or hardware. Thus, it will be appreciated that one or a combination of hardware and software, such as a computer system executing software for performing the functionality of the modules, may implement each of the modules shown in FIG. 2. It will also be appreciated by those skilled in the art that the ETM 110 may comprise one or more other types of modules, circuitry, etc., not shown in FIG. 2 in order to avoid unnecessarily obscuring understanding of the invention. For instance, the ETM 110 may include one or more microprocessors, network connection circuitry, and/or data storage areas, such as read-only memory (ROM), random-access memory (RAM), CDROM, DVD, tape drive, hard disk (HD), and/or other types of storage areas. It will also be appreciated that the functionality of multiple modules described herein can be combined into a single module and the functionality of a single module can be split or shared among multiple modules. Moreover, alternative embodiments of the present invention can lack one or more of the modules described herein and/or have modules not described herein.

The ETM 110 preferably includes an OMS data integration module (ODIM) 212. The ODIM 212 receives and processes data representative of orders received from the OMS databases 114 in the trading systems 112. In a preferred embodiment, the data from the OMS databases 114 are provided to the ETM 110 in a standardized format that requires little processing by the ODIM 212. In an alternative embodiment, the data from the OMS databases 114 are provided to the ETM 110 in one or more different formats depending upon factors such as the type of OMS used by the trading systems 112, the types of interfacing links supplying the data to the ETM, the type of security or orders to which the data pertains, and the like. In this latter embodiment, the ODIM 212 preferably converts the data into a standardized format for use by other modules in the ETM 110.

The orders processed by the ODIM 212 may be stored in an ETM database 214. Data in the database 214 are preferably accessible to the other modules in the ETM 110. In addition, the other modules in the ETM 110 can store other data in the illustrated database 214 or other databases as may be required during normal operation.

In a preferred embodiment, an indications module 216 transmits information about orders received by the ETM 110 among the various traders based upon filtering criteria established by the traders and/or the ETM. This information is transmitted among the traders in the form of non-binding indications.

Based upon these indications, traders may be able to enter into negotiations with other traders through a negotiation module 218. The negotiation module 218 may facilitate negotiations between traders using trading systems and having contra interests. In one embodiment, at least parts of the negotiations are conducted anonymously, in order to limit the spread of information about the traders' activities.

A market data module 220 may receive real-time and/or other market data from an input 222. The market data module 220 may provide the market data to the negotiation module 218 and/or to the traders. The traders preferably use the market data during the negotiations to determining market prices for the securities.

A transaction history module 224 may record transactions performed by the ETM 110 in the database 214. The transaction history module 224 also preferably records other data processed by the ETM 110 including, for example, information about orders received from and sent to the trading systems 112 and the negotiations conducted (successful or not). This module 224 is preferably used to audit the transactions conducted on the ETM 110.

In some embodiments, the transaction history module may record transaction information as well as information about orders that were placed but unfulfilled. Such information may be used to provide products, and/or services to traders. For example, information about a frequency of orders placed for a particular security may be recorded and used to inform traders about how liquid a market for the security has been historically and/or how long an order may take to be fulfilled based on historic trades. As another example, information about fulfilled transactions for a particular trader may be used to provide information about other goods or services that the trader may desire, such as hedging opportunities related to the trades (e.g., available futures trades on a same or different ETM that may be used to hedge an equity purchase, etc.). As yet another example, some embodiments may use recorded information to determine that major changes in a trading pattern of a security (e.g., a major price drop, a major change in liquidity, etc.) has occurred, and use such information to adjust performance (e.g., prepare for a major increase in trading activity, offload orders to a different market, pause acceptance of orders temporarily until trading has stabilized, etc.) trade on a security (e.g., for an account/fund associated with an ETM operator) and/or provide such information to traders.

A trader authentication module 226 may authorize and/or authenticate traders who log into the ETM 110 in order to perform trading negotiations and/or other functions. In one embodiment, the trader authentication module 226 stores authentication information, such as a login ID/password pair in the database 214. The trader authentication module 226 also preferably stores profiles for the registered traders.

Other modules that may be present in the ETM 110 include load monitoring modules for monitoring the load on various servers comprising the ETM, fault tolerance modules for providing fault tolerance to the ETM, security modules for preventing and detecting security violations on the ETM, and back office modules for providing back office functionality. These modules are not shown in FIG. 2 in order to avoid unnecessarily complicating the figure.

Figure 3:
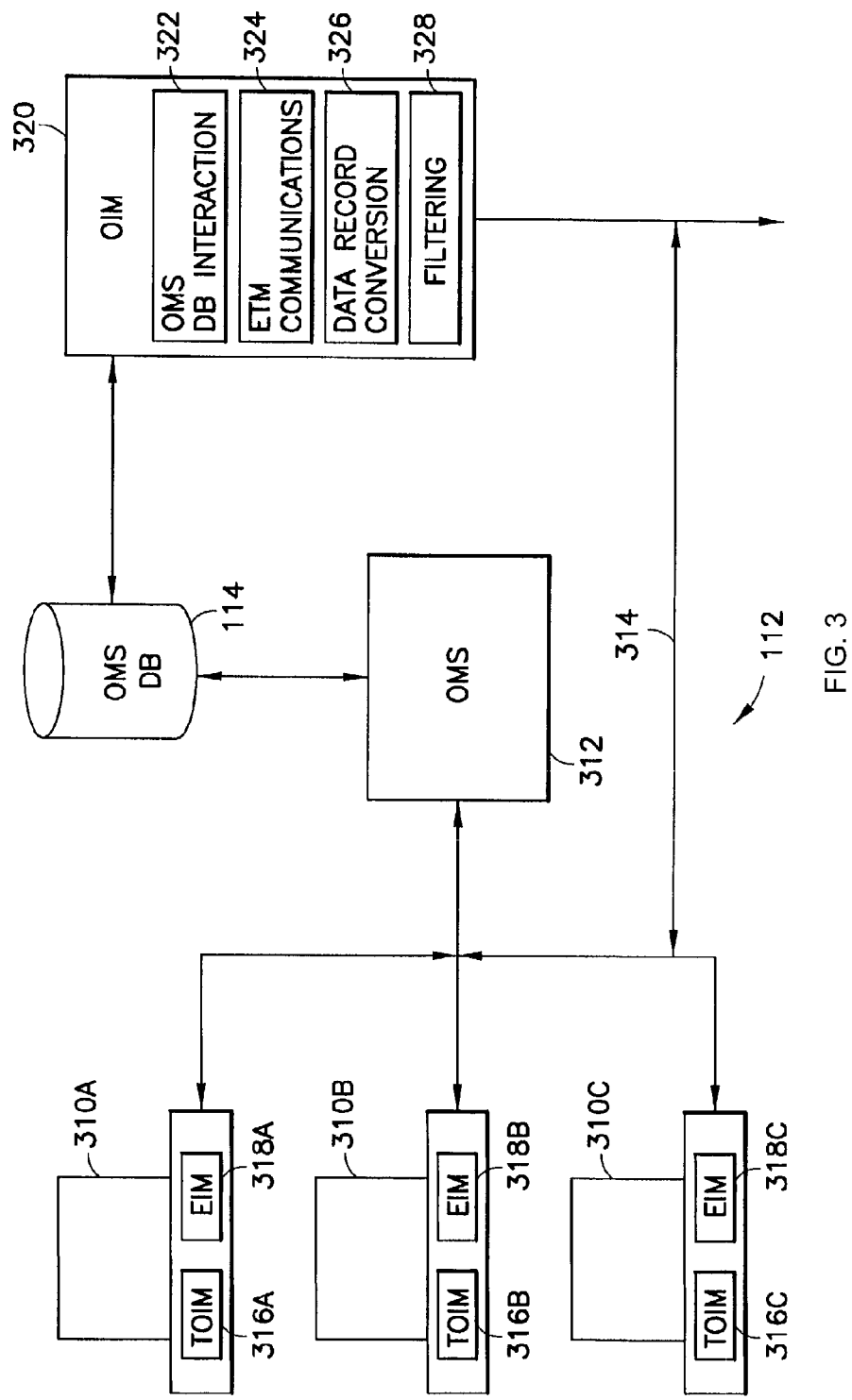
FIG. 3 is a lower-level block diagram illustrating a trading system like those illustrated in FIG. 1.

FIG. 3 is a lower-level block diagram illustrating a trading system 112 like those illustrated in FIG. 1. Those of ordinary skill in the art will recognize that FIG. 3 illustrates only one possible embodiment of a trading system 112 and alternative embodiments of the trading system exist. FIG. 3 illustrates three workstations 310A, 310B, 310C coupled to an OMS server 312 via a network 314. The workstations 310 are preferably general- or specific-purpose computer systems executing specialized software for facilitating trading of securities. Although only three workstations 310 are illustrated, a trading system 112 can have any practical number of workstations.

In a typical trading system that interacts with the ETM 110, each workstation 310 executes a trader OMS interaction module 316 (TOIM) for facilitating interactions with the OMS server 312. In this typical trading system, the TOIM 316 allows a trader to add, delete, or modify open or contemplated orders stored in the OMS database 114. Contemplated orders may be stored in the OMS database 114, for example, because the trader intends to execute certain transactions in stages, or because the contemplated transactions are desirable only if the market prices of the securities to be traded are within a certain range (e.g., limit orders). Therefore, such orders serve as placeholders indicating the total quantity of a security that a trader wishes to transact and conditions for transacting other orders; other data in the database 114 indicate the quantity of the security that has been transacted to date.

Each workstation 310 may execute an ETM interaction module 318 (EIM) for facilitating interactions with the ETM 110. In alternative embodiments of the present invention, the EIM 318 is incorporated into the TOIM 316 or other modules on the workstation 310. The EIM 318 allows a trader to send information to the ETM 110 and view and respond to information received from the ETM 110. Typically, the received information includes information about orders (through the indications module 216) and orders (through the negotiation module 218) that the ETM 110 receives from other traders or trading institutions. The trader uses the EIM 318 to enter into and transact negotiations to buy and/or sell securities through the ETM 110.

The network 314 connects the workstations 310 to the OMS 312 and to external networks such as the network in communication with the ETM 110. The network 314 can utilize any networking technology that supports bi-directional transfer of data among the OMS 312, workstations 310, and external networks. In a typical embodiment, the network 314 is a private local area network (LAN) installed at a financial institution and interfacing with one or more external gateways. In alternate embodiments, the network may be wireless, connect devices over a wide area, and/or at least partially carry data over a public network (such as the Internet). Other network components, such as a firewall, may also be present. Those of ordinary skill in the art will recognize that many different types of networks can perform the functionality described herein.

The OMS 312 is preferably comprised of one or more computer systems for executing and maintaining an order management system. The OMS 312 receives instructions from the workstations to create, modify, and/or delete orders and updates the database 114 accordingly. Software providing the functionality of the OMS 312 is well known in the art. Commercial OMS software packages are available from The MacGregor Group, Eze Castle Software, Advent Software, and Decalog, to name but a few. In addition, some trading institutions utilize custom OMS software.

As described above, the database 114 may hold data representative of open, contemplated, and/or completed orders to buy and/or sell securities. FIG. 4 is a diagram illustrating a data record 400 stored in the database 114 to identify an order according to one embodiment of the present invention. Different OMS systems utilize different order data records and, therefore, it should be understood that FIG. 4 illustrates only one possible data record. However, many OMS systems store the same general information and the illustrated order data record 400 is intended to represent a typical order data record for an OMS system.

The order data record 400 has multiple fields, each field holding different information about an order. The Order ID field 410 preferably holds a value uniquely identifying the order associated with the data record 400. Similarly, the Trader ID field 412 preferably holds a value uniquely identifying the trader or other person who placed the order. The Order Status field 414 identifies whether the order is open, contemplated, completed, canceled, or any other possible status. The next field, Order Last Update Time 416, preferably holds a timestamp that identifies the last time that the data record 400 was modified in any way. This field 416 is useful for determining whether the most recent version of the data record 400 has been considered.

The Transaction Type field 418 preferably indicates whether the data record 400 corresponds to an order to buy or sell a security. The Security Symbol field 420 preferably uniquely identifies the security to be transacted. The Security Symbol field 420 can hold, for example, a Committee on Uniform Securities Identification Procedures (CUSIP) number, a ticker symbol, or any other identifier of the security. The Security Type field 422 is preferably used to interpret the other data in the data record 400 according to the given security type. For example, treasury bills are priced in terms of a discount to face value; inherent in the pricing formula is the yield that would be obtained if the bill were held to maturity. In contrast, equity securities are priced in actual per-share values. The information in the Security Type field 422 can also be used to filter out certain types of securities.

The Order Type field 424 preferably indicates whether the order is a market or a limit order, although the field can also indicate other order types. If the order is a limit order, the Limit Price Field 426 preferably identifies the price set by the trader.

The Total Order Size field 428 preferably identifies the actual number of shares that the trader desires to transact. The Quantity Placed Elsewhere field 430 is a value either equal to or less than the value in the Total Order Size field 428. In an embodiment of the present invention, the ETM 110 uses the values of these two fields 428, 430 to determine a quantity of a security, if any, that are available to be transacted by the ETM.

Preferably, the OMS 312 allows for the possibility that trading a large quantity of a given security may occur over several days at several different venues. For example, to fill an order to buy 1,000,000 shares of IBM, a trader may need to place an order for 300,000 shares with one broker, and record numerous executions of portions thereof until the full 300,000 shares placed with that broker are purchased. If the broker cannot provide additional shares at a suitable price, the trader may then place an additional quantity, up to the 700,000 shares remaining to be purchased, via another broker, electronic marketplace, or other venue. Preferably, the broker enters a placement record into the OMS database 114 to indicate that the trader anticipates executing a portion of the order through the second venue. This second venue may also fill the quantity it was asked to provide in several executions. Thus, an order can have one or more placements and each placement can have one or more executions associated with it.

Figure 5:
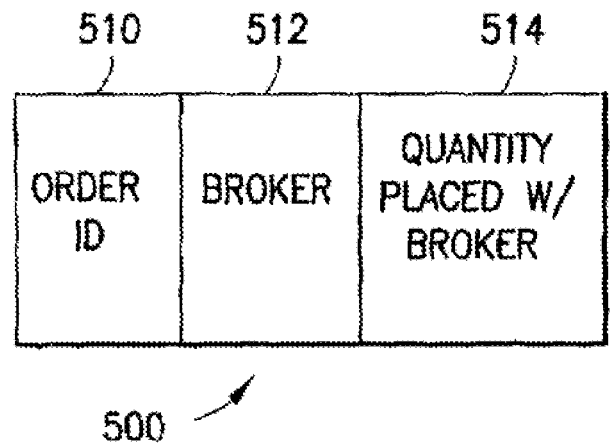
FIG. 5 is a diagram illustrating a placement record preferably stored in the OMS database to indicate a placement of an order at a particular venue.

FIG. 5 is a diagram illustrating a placement record 500 preferably stored in the OMS database 114 to indicate a placement of an order at a particular venue. The Order ID field 510 preferably holds a value that uniquely identifies the order associated with the placement. The Order ID field 510 ties the placement information to the overall order. Thus, all placements for the same order preferably have the same value in this field 510. The Broker field 512 preferably contains an alphanumeric value identifying the venue associated with the placement record. Lastly, the Quantity Placed with Broker field 514 preferably lists the portion of the total order size that is placed for fulfillment through the venue.

Figure 6:
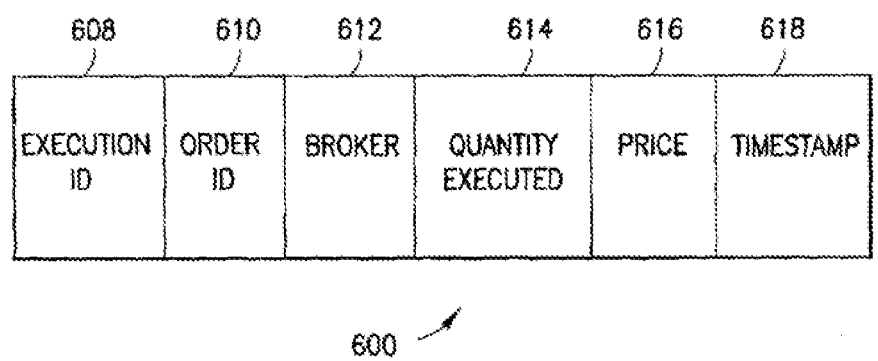
FIG. 6 is a diagram illustrating an execution record preferably stored in the OMS database to indicate the execution of an order.

When a transaction is executed in a specified venue, such as the ETM 110, a corresponding execution record is preferably stored in the OMS database 114. FIG. 6 is a diagram illustrating an execution record 600 according to an embodiment of the present invention. An execution ID field 608 preferably holds a value identifying the particular execution. As before, the Order ID field 610 preferably holds a value that uniquely identifies the order associated with the execution and all executions for the same order preferably have the same value in this field 610. The Broker field 612 preferably contains an alphanumeric value identifying the venue that performed the execution. The Quantity Executed field 614 preferably specifies the number of securities transacted in this execution while the Price field 616 specifies the price at which the securities were executed. The Timestamp field 618 preferably records the time at which the execution took place.

The OMS interfacing module (OIM) 320 may be in communication with the OMS database 114 via the network 314 or a direct connection. In alternative embodiments, the OIM 320 is in communication with the OMS 312 and/or the workstations 310. The OIM 320 may also be in communication with the ETM 110 via an external gateway or some other form of network connection. In another alternative embodiment, the OIM 320 is integrated into the ETM 110 and is remote from the OMS 312, although some functionality is present at the OMS in order to provide OMS data to the OIM.

In a preferred embodiment, the OIM 320 includes a computer system storing and executing software for performing the functionality described herein. In an alternative embodiment, the OIM 320 executes on the same computer system as the OMS 312. In one embodiment, the OIM 320 includes an OMS database interaction module 322 for interacting with the OMS database 114. The OMS database interaction module 322 reads records stored in the OMS database 114 and, in a preferred embodiment, creates and modifies data records stored in the OMS database 114. In one embodiment, the OMS database interaction module 322 directly accesses the OMS database 114 and in another embodiment it sends commands to an applications programming interface (API) in the OMS 312 for accessing the database.

The OIM 320 also preferably includes an ETM communication module 324 for communicating with the ETM 110. In one embodiment, the ETM communication module 324 automatically provides selected data records in the OMS database 114 to the ETM 110 and, in a preferred embodiment, receives data and/or instructions from the ETM. In addition, the OIM 320 also preferably includes a data record conversion module 326 for modifying the format of the data records sent to and/or received from the ETM 110 and a filtering module 238 for filtering out specified orders by security type, security name, order type, order quantity, order price, or some other factor or category, so that filtered orders are not transmitted to the ETM.

Figure 7:
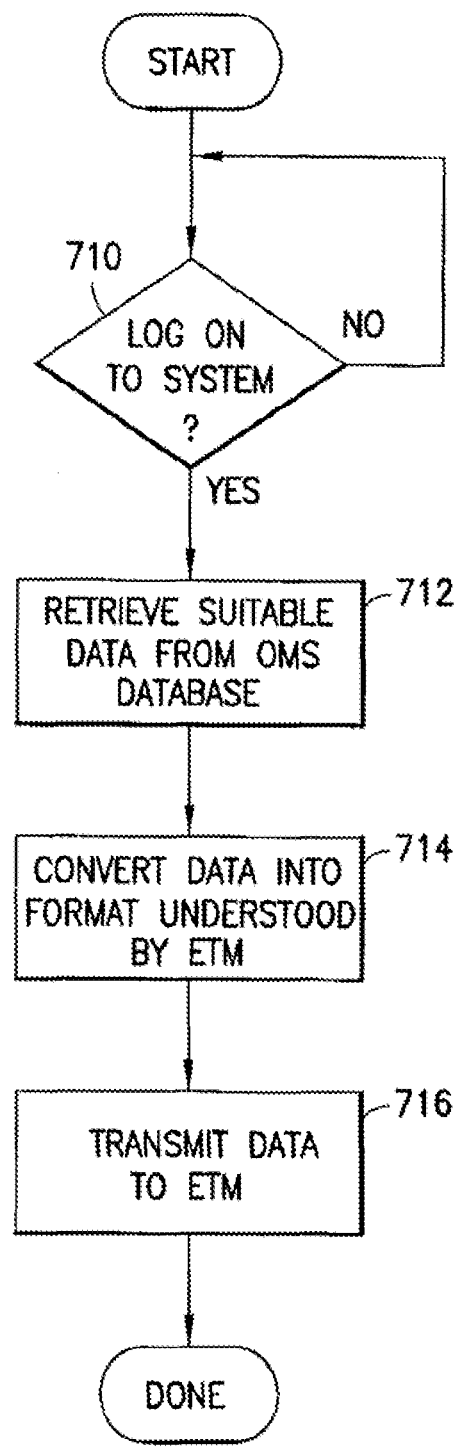
FIG. 7 is a flow diagram illustrating actions performed by an embodiment of the present invention when a trader logs on to the ETM.

FIG. 7 is a flow diagram illustrating actions performed by an embodiment of the present invention when a trader logs on to the ETM 110. Although the actions of FIG. 7 and subsequent figures are attributed herein to the OIM 320, one of ordinary skill in the art will recognize that all or some of the actions can be carried out by other entities.

Preferably, the OIM 320 waits 710 until a trader logs on to the OMS 312 before transmitting data records for that trader to the ETM 110. In one embodiment, the ETM 110 sends a message to the OIM 320 when a trader at the institution in which the OIM 320 resides logs into the ETM. The OIM 320 interprets this message as a sign to commence receiving orders. In other embodiments of the present invention, the OIM 320 uses other techniques, such as querying the OMS database 114 for specific entries, listening for an inter-process message sent by the OMS 312, polling individual trader workstations 310, or implementing a timer-based algorithm, to determine that a trader has logged on to the OMS 312.

Once a determination 710 is made that a trader has logged on to the OMS 312 the OIM 320 may retrieve 712 data records about orders suitable for transmission to the ETM from the OMS database 114. In one embodiment of the present invention, all open orders are suitable for transmission to the ETM 110. In other embodiments of the present invention, the OIM 320, through the filtering module 328, makes the determination of suitable orders based on other criteria, such as the security type (e.g., stock or bond), security name (e.g., IBM or T), order type (e.g., market or limit order), order quantity, and/or order price. In still other embodiments, only orders selected by a trading firm (e.g., by the trader) associated with the OMS may be suitable for transmission.

If necessary, the data record conversion module 326 within the OIM 320 preferably converts 714 the data records retrieved from the OMS database 114 into a standardized format understood by the ETM 110. As described above, the functionality of the data record conversion module 326 can also be performed by the ODIM 212 in the ETM 110. Alternative embodiments of the present invention may send the data records individually or in multiple batches. The data transmitted to the ETM 110 depend on factors such as the types of securities being traded, and/or the fields required in order to accurately trade such securities.

Figure 8:
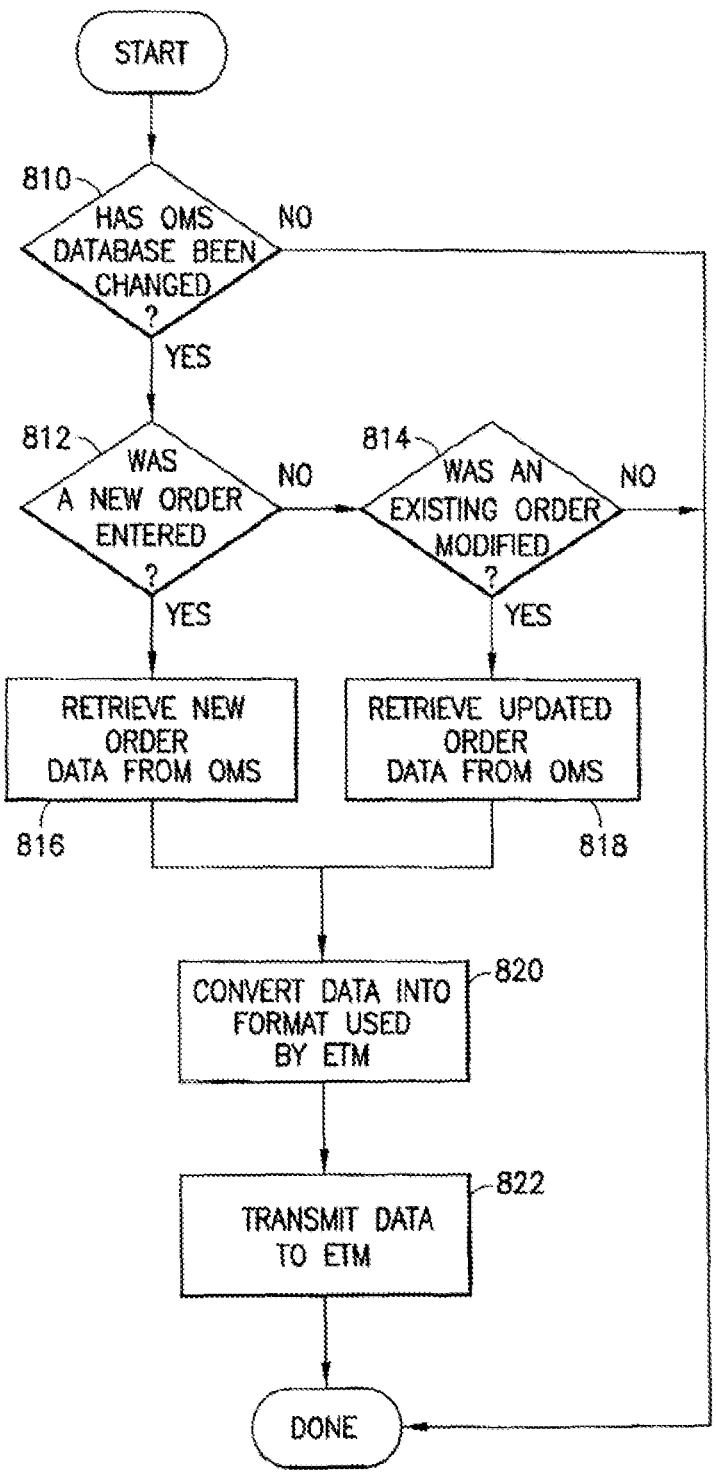
FIG. 8 is a flow diagram illustrating actions performed by an embodiment of the present invention after a trader has logged on to the ETM.

FIG. 8 is a flow diagram illustrating the actions performed by an embodiment of the present invention after a trader has logged on to the OMS during the trading day. The actions of FIG. 8 are preferably automatically performed multiple times during the trading day. Initially, the OIM 320 may determine 810 whether the contents of the OMS database 114 have changed. The OIM 320 can perform this step by, for example, polling the database 114 at regular, near-real-time intervals, querying the database for contents of specified fields such as timestamps, and/or listening for network or specific interprocess communication message traffic.

If the database has changed, the OIM 320 preferably determines whether the change should be transmitted to the ETM 110. Because typical OMS's are complex and multi-featured, and because securities of types not handled by the ETM 110 may be traded using the OMS 312, some changes to the OMS database 114 may not necessitate a transmission of updated data to the ETM 110. Thus, the OIM 320 may determine 812 whether the change to the database 114 reflects a new order of a type that is traded in the ETM 110 (and in some embodiments, other ETMs and/or marketplaces coupled to the ETM 110). If so, then the OIM 320 may retrieve 816 the pertinent data for the order from the database 114. If the change does not reflect a new order, then the OIM 320 preferably determines 814 whether the database change pertains to a modification of an existing order that has already been sent to the ETM 110. If so, the OIM 320 may retrieve 818 the data records corresponding to the modified order from the database 114. Once the appropriate data records, if any, are retrieved from the database, the OIM 320 preferably converts 820 the data records into the appropriate format and transmits the records to the ETM 110 as described above with respect to FIG. 7.

Figure 9:
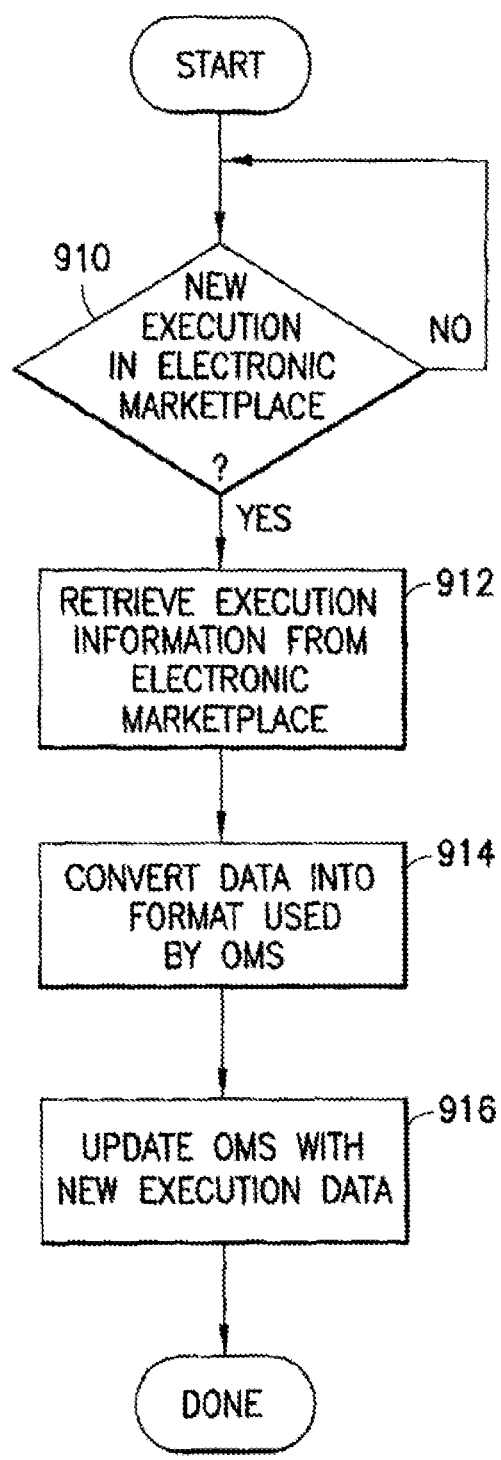
FIG. 9 is a flow diagram illustrating actions performed by a preferred embodiment of the present invention when the OMS database is updated in response to a trade executed by the ETM.

FIG. 9 is a flow diagram illustrating the actions performed by an embodiment of the present invention when the OMS database 114 is updated in response to a trade executed by the ETM 110. The illustrated steps can be performed each time a trade is executed, or in batch. However, the steps are preferably performed frequently enough so that the OMS database 114 is updated in substantially real-time.

The OIM 320 initially may determine 910 whether an execution occurred in the ETM 110 involving an order in the OMS 312 associated with the OIM. The step may be performed, for example, by receiving a message from the ETM 110 identifying a particular execution that occurred at the ETM, by filtering a list of all executions or other data from the ETM for executions listed in the OMS 312, or by periodically polling the ETM for performed executions.

If an execution occurred in the ETM 110 involving an order in the OMS 312 associated with the OIM 320, the OIM receives 912 information from the ETM describing the execution. This information includes, for example, the type, amount, and price of securities traded, the time of execution, and/or information identifying the original order in the OMS database 114 on which the execution was based. The OIM 320 may convert 914 the received information about the execution into the format used by the OMS 312. Then, the OIM 320 may update 916 the OMS database 114 with the converted execution data. As a result of these steps, the OMS 312 may be updated automatically and transparently to reflect executions performed at the ETM 110. The executions appear to the OMS 312 as typical trades conducted at another broker.

In some embodiments information about orders in an OMS database and/or any other information about a trading institution may be used to provide additional (e.g., complimentary, alternative) products and/or services to traders. The information about the orders may include the existence of the orders, the existence of counter orders, the lack of counter orders, historical data about similar orders, historical data about counter orders, knowledge that an order was unfulfilled (e.g., for some time period, was removed from the system in an unfulfilled state, etc.), knowledge about a broader trading plan that may be embodied by specific orders (e.g., knowledge that a particular order is present because of a desire to trade in a particular industry, market capitalization, etc.), knowledge that an order was fulfilled, knowledge that an order is now inactive (e.g., was fulfilled, expired, was unfulfilled, etc.) information about a risk model, and/or any other information. In some embodiments, such features may be available to premium users of an ETM (e.g., users willing to pay a fee). The additional products and/or service may be available through a single ETM and/or additional ETMs.

In some embodiments, an ETM, OIM, OMS, and/or other component may track (e.g., determine when an order becomes inactive and store information about it) unfulfilled orders (e.g., expired orders and/or orders that were removed (e.g., removed from an OMS, removed from consideration by the ETM, etc.)). The knowledge that an order was once placed and was not fulfilled may reveal that a trader associated with the order may desire a trade in a security associated with the order in the future. When new orders are received, there may be no available counter parties currently trading in a security identified by the order. The existence of counter parties may be determined by searching (e.g., through a listing maintained in a database of the ETM) for matching offers received from a plurality of other traders using an ETM. In some implementations, if no such parties are available, unfulfilled orders may be used to find such parties. Such use of unfulfilled orders may occur after a new order has been active (e.g., near an expiration time of the order, after an indication that the order is being otherwise removed from the system is received, etc.).

The use of such unfulfilled orders may include querying a party associated with the unfilled order (or any other inactive order). Such query may ask if the party is still interested in a trade related to the security and/or identify that a matching counter order is now available. The party may then reenter an order, enter into negotiations with the party associated with the new order, ignore the request, and/or take any other desired actions.

In some embodiments, before such unfulfilled orders are used, a party associated with the new order may be asked if such use is desired. To encourage the use of such orders for matching, the party associated with the new order may be provided with statistics related to the usefulness of such orders. The statistics may be gathered by a transactional history module of an ETM and may include, for example, a percentage of times when such orders have successfully fulfilled an order, and/or any other desired information. The information may be selected at a degree of abstraction that is most convincing (e.g., overall securities, securities in a related industry, a specific security, a specific counter party, etc.).

In some embodiments in which multiple unfulfilled orders exist, priority may be given according to any desired priority mechanism. For example, possible counter parties associated with larger orders may be queried first, possible counter parties associated with most recently expired orders may be queried first, etc.

In some embodiments, counter party identities may be kept anonymous during part or all of a querying process associated with the use of unfulfilled orders. Also, size of orders, and/or any other information related to new and/or inactive unfulfilled orders may be kept confidential during the process until the counterparties choose to reveal such information.

Any number of unfulfilled orders may be tracked for any desired time period. For example, in some embodiments some number of the most recently expired orders may be tracked. In some embodiments, all unfulfilled orders may be tracked for some desired period. In some embodiments, the tracking may relate to characteristics of the security. For example, orders associated with a less liquid security may be tracked for a longer time than orders associated with a more liquid security.

Fulfilled orders, may be tracked for use in fulfilling future orders, in a substantially similar method to tracking unfulfilled orders described above. This may be useful because a trader that has previously traded in a security may be more likely to trade in that security again. The fulfilled orders may be fulfilled through the ETM and/or through some other method (e.g., a different marketplace).

In some embodiments, if it is determined that no matching counter parties (e.g., counter parties with orders matching the order in their OMS's) are available (e.g., a counter party is not found for an order (e.g., after some time period, near an expiration time for an order, etc.)) alternative products and/or services may be offered to a trader. The alternative products and/or services may be based, at least in part, on a characteristic of an order entered by the trader. The desired characteristics may include, for example, market capitalization, geographic area, industry, risk level, profit to loss ratio, volume of trades, profit level, sales level, cash on hand amount, analyst recommendation, and/or any other information. For example, derivatives based on the security may be offered (e.g., from other orders available to the ETM, from another market, etc.), other securities may be offered (e.g., securities with similar profiles such as capitalization, industry, etc., securities that were purchased by other traders who also placed similar orders (e.g., after a similar order went unfulfilled), securities that fulfill a desire associated with the order (e.g., a desire to adjust a portfolio to include a particular industry, etc.)). In some embodiments, information about how long an order may take to be fulfilled based on historical trading trends may be provided. Such information may encourage a trader to take an alternative to the order if the time is too long or wait for order fulfillment if the time is short.

In some embodiments, an alternative product and/or service may include a trade that is based on a reason for the order in the trader's OMS database. For example, an ETM may receive information about the reason that the order is present in the OMS (e.g., a desire to own a security in a particular industry), and based on that reason may determine that an alternative available order may fulfill the same reason and offer that order as an alternative. In some embodiments a reason may be part of a broader trading strategy and/or risk model that may be shared with the ETM, so that the ETM may offer alternatives that more closely fulfill reasons embodied by the order and that fits into the broader trading strategy and/or risk model.

In some embodiments, if a matching order is found for an order, additional (e.g., complementary) products and/or services may be offered. For example, the fact that an order has been, at least partly, fulfilled may be determined, and in response, an additional product and/or service may be offered. The order may be fulfilled through the ETM and/or through some other method and identified as fulfilled to the ETM (e.g., through a status change in an OMS). The product and/or service may be offered from a marketplace operator, a participant of a marketplace, and/or any other source.

For example, a trader may be offered a hedging opportunity after an order for a security is fulfilled. Such a hedging opportunity may include a future related to the security. The hedging opportunity may be available through a different counter party on the same ETM (e.g., may be found in similar fashion to finding an original counter party) and/or through another marketplace.

In some embodiments, historical data about previous orders may be used to recommend additional products and/or services. For example, if a trader has a trade go unfulfilled, the trader may be presented with an available order that was often entered by traders that also had similar orders go unfulfilled.

In some embodiments, historical information may be used to adjust treatment of new orders. For example, if an order is entered for a historically illiquid security, additional avenues may be used to find a matching order, such as prior traders who had entered orders for the security, other marketplaces, etc. In some embodiments, other traders may be information of the existence of an order for an illiquid security. Traders may be encouraged to enter counter orders for illiquid securities through any desired incentivizing method. For example, traders may be offered priority in liquid orders if they enter an order for an illiquid security, traders may be offered rebates for entering such orders, and/or traders may be offered any desired incentive for entering such orders.

In various embodiments, trades may be related to any desired currency or country (e.g., stocks of U.S. companies, stocks of Chinese companies, British savings bonds, etc.). In some embodiments, a trader in one country may enter into a trade involving another country and/or the currency of another country (e.g., a U.S. trader may purchase debt of a Japanese company).

In some such embodiments, additional products or services may be offered based on the knowledge of a currency associated with a trade. For example, one or more currency trade contracts may be offered to a trader involved in such trading. A currency trade contract may act as a hedging instrument against volatility in currency markets. Such a contract may allow a trader to exchange the contract for some cash value if the currency associated with the trade changes in value compared to the trader's native currency. In some embodiments, the availability of such contracts may be included as a negotiation option between traders when negotiating a trade. In some embodiments, traders may trade in such contracts among each other independently of any other trade (e.g., through the ETM and/or some other marketplace). In some embodiments, a trader may be offered such a contract as a service from a marketplace (e.g., the operator of the ETM may offer such contracts for a fee as a service to users of the ETM).

Some embodiments may include participants from different time zones. Such participants may not always be active at the same time due, in part, to the differences in the time zones. Accordingly, one or more mechanisms may be used to address these time zone differences.

For example, in some embodiments, participants may be able to establish automatic trading profiles that can be used to automatically negotiate, accept, and/or reject trades during times when the participants are not active (e.g., at night, on holidays, etc.). Such profiles, for example may indicate that orders for securities in a certain price range should always be accepted, and/or any other desired actions should be taken.

In some embodiments, active trading times may be tied to a particular market (e.g., the New York Stock Exchange). By limiting trading to hours similar to a particular market, participants may be sure that they can participate in trades by being present during that period of time.

In some embodiments, a marketplace (e.g., the ETM) may determine if a participant is active and involve active participants in potential trades with some level of preference. Such determining may include monitoring a level of activity at a computer terminal, presenting a query through a computer interface, and/or any other desired action. In some embodiments, if a participant is not active (e.g., has gone home for the day), the participant may not be eligible to be part of a trade until the participant becomes active again. In other embodiments, active participants may be given preference over inactive participants, but inactive participants may still be offered an opportunity to be involved in trades.

In some embodiments, if a matching order involves an active trader and an inactive trader, a negotiation may be started between the two traders. The active trader may be informed that the inactive trader is inactive. The active trader may be given an estimate of when the inactive trader may be active (e.g., an indication of a time zone difference, historic data, etc.). While waiting for the inactive trader to become active to enter into a negotiation, the order associated with the active trader may still be used to search for other matches (e.g., with other active traders). When the inactive trader returns to active status, the previously inactive trader may enter into a negotiation about the trade with the previously active trader. The previously active trader may have gone inactive by the time the previously inactive trader becomes active. Because such a problems may occur due to time difference, a negotiation may take a long time to complete. In some embodiments, one or more sides of the negotiation may enter information to automate the negotiation (e.g., preferences, limit prices, etc.), so that the negotiation may complete in a shorter time.

Some embodiments may be limited to buy side trading participants (i.e., investing institutions that tend to buy large portions of securities for money-management purposes). Other embodiments may include buy side participants and sell side participants (e.g., brokers, retail analysts, etc.). Buy side participants are typically protective of revealing trading intentions because of a fear of malicious market manipulation and a fear of revealing proprietary trading strategies. Some embodiments which allow sell side participation may include mechanisms to address such fears of buy side participants.

For example, in some embodiments, buy side participants may be able to opt out of trading with sell side participants. In some embodiments, buy side participants may be able to establish filters that allow only some sell side participant orders to be traded with the buy side participants. For example, filters may allow sell side participant orders for a sufficient amount of a security, if the sell side agrees to a non-negotiated fulfillment of the order (e.g., according to a standard price such as the most recent traded price, etc.) and/or if the sell side and/or the sell side participant's order meets any other desired criteria of the buy side participant.

In some embodiments, indications of one or more criteria for use in filtering orders may be received. The criteria may be used to establish appropriate filters so that orders not meeting the criteria are filtered. If orders do meet the criteria, the orders may be presented to the market participant that established the criteria. In some embodiments, the criteria may include a time related criteria (e.g., when the order is received, when the order may be presented to the market participant (e.g., orders for XXX security may only be presented between noon and 2 pm, etc.), etc.). In some embodiments, the criteria may include quantity-related criteria, an identification criteria, a price-related criteria, a type-related criteria, an industry-related criteria, and/or any other criteria.

Some embodiments may limit options available to sell side participants. For example, sell side participants may only be able to enter binding orders. If a sell side participant's order finds a counter party in a buy side participant, the sell side participant may be bound to fulfill the order. In some embodiments, even though a sell side participant is bound to fulfill an order, a negotiation for price and/or quantity may still occur between a buy side participant and a sell side participant. In other embodiments, no negotiation may be started, but, rather, a trade may be facilitated without a negotiation (e.g., if the buy side accepts the offer, the trade may occur automatically, according to a standard pricing mechanism, for a quantity of securities identified in the sell side order, etc.).

In some embodiments, a request for acceptance of an order may be transmitted to one or more market participants (e.g., buy side participants). In some embodiments, such participants may receive the requests for acceptance of an order. In some embodiments, the market participants may be allowed to respond to the request for acceptance within a limited amount of time. If the participant responds affirmatively to the request for acceptance within the limited time, then an indication of acceptance may be transmitted and/or an execution of a trade fulfilling at least a portion of an order may be facilitated.

In some embodiments, a sell side participant may be required to enter a quantity of a security to be traded when entering an order. A sell side participant may be bound to that quantity if an order from a buy side participant matches the sell side order. In some embodiments, the sell side participant may negotiate to increase the quantity, but may be limited to the quantity as a minimum. In some embodiments, a sell side participant may only enter orders above a threshold minimum quantity.

In some embodiments, to avoid negotiations between sell side and buy side participants, sell side participants may be bound to have their orders fulfilled according to a standard pricing mechanism. Such a pricing mechanism may include fulfilling the order based on a well-known midpoint pricing policy and/or any other desired mechanism.

In some embodiments, when two sell side participants become counter parties to a trade, they may not be restricted in the same manner as when a sell side participant is a counter party to a buy side participant. For example, if two sell side participants enter a negotiation, both may enter negotiations for price and/or quantity even if such negotiations are limited or not allowed at all when a sell side participant and a buy side participant are counter parties.

In some embodiments, parties with matching orders may enter into a limited negotiation. For example, execution of a trade fulfilling matching orders may include a negotiation that does not include a negotiation about price and/or a negotiation about quantity. A price, for example, may be determined using a VWAP, midpoint, and/or any other desired pricing policy. A quantity may be determined based on quantities defined by the matching orders. If there are any other issues to be negotiated, some embodiments may allow a negotiation for those issues (e.g., time of execution, platform to use for execution, etc.)

In some embodiments, evidence of actions/things may be suppressed from one or more parties. For example, in some embodiments, when a determination is made that one order matches another order, any evidence of that determination may be suppressed from one or more parties associated with the orders and/or any other parties; when a criteria for a filter is established, any evidence of the criteria and/or the establishment of the filter may be suppressed; when a determination about whether an order meets criteria of a filter is made, evidence of that determination may be suppressed. Such suppression of evidence may occur until some action occurs and/or for some amount of time. For example, in one implementation, evidence that a first party's order matches a second party's order may be suppressed from the first party until and unless the second party decides to proceed with the order and/or until the execution of the order is facilitated.

In some embodiments, suppressing evidence of an event may include performing any action or not performing any action so that an observer is led to believe that the event did not occur. For example, suppressing evidence may include performing one or more actions that would occur if the event did not occur (e.g., transmitting requests, transmitting indications that the event did not occur, etc.), transmitting misleading information regarding the event (e.g., transmitting indications that the event did not occur, transmitting indications that another event occurred, transmitting information before the event and/or after the event that obscure the occurrence of the event (e.g., indications that the event happened earlier and/or later so that the actually occurrence of the vent is obscured)), not transmitting information that the event occurred, transmitting imitations information to mislead observers, encrypting information transmissions, using onion routing techniques, obscuring a source of transmissions, obscuring a destination of transmissions, obscuring the timing of events, and/or any other actions.

In some embodiments, an order may include an order to purchase or sell a quantity of a financial instrument. The side of the order may refer to whether the order is for a purchase or a sale of a financial instrument. Two orders may match if the orders are for the same financial instrument and are for opposite side of a trade for that financial instrument. Other criteria, such as quantity, price, etc., may also be sued to determine if orders match each other.

In some implementations, an order may indicate a price range in which a execution of a trade fulfilling at least part of the order is agreed. In such implementations, a first order may match a second order if the two orders are for opposite sides of a trade for a single financial instrument and the two orders have at least partially overlapping price ranges. In some implementations, an actual price of a trade may be determined according to a VWAP and/or midpoint pricing model.

In some embodiments, facilitating execution of a trade may include taking any actions which help to bring about the execution of a trade. In some implementations, facilitating execution may include, for example, executing the trade, beginning a negotiation between the first market participant and the second market participant that does not involve the price of the trade and does not involve the quantity of financial instruments in the trade, transmitting information about the trade to a third party to execute the trade, and/or any other actions. Such actions may include centralized actions and/or distributed actions.

In some embodiments, one or more market participants may be charged a fee for use of a trading system. For example, if matching orders are found and/or facilitation of order execution is performed, a fee may be charged to the parties related to the matching orders. In some embodiments, some parties may be incentivized to use a trading system by providing a financial incentive regarding such fees. For example, in some embodiments, some participants may not be charged a fee, orders meeting certain criteria may not be charged a fee, some participants may be given a payment to submit orders, and so on. Such incentivizing may help to increase liquidity in a market where certain participants may be otherwise unwilling to provide such liquidity.

In some implementations, for example, a portion of a fee charged to a first participant may be provided to a second participant. In some implementations, providing the portion of the fee to the second participant may include paying at least part of a second fee for the second participant (e.g., discounting the fee of the second participant by the portion). In some implementations, providing the portion may include crediting an account of the second participant (e.g., providing a payment to a financial account). In some implementations, buy side participants may be given a discount and/or a payment for use and sell side participants may be charged a fee. The fee charged to sell side participants may be sued to pay the discount or payment given to buy side participants. In some implementations when two buy side participants interact, no discount, no fee, and/or no payment may be made to either party. In some implementations, the first party to submit an order may be given a discount and/or payment.

In some embodiments, various actions taken by traders and/or information presented to traders may be taken/presented through one or more user interfaces of computing devices. For example, indications of orders, negotiations, etc. may be facilitated by user interfaces through which traders may interact. Traders may enter order information, accept order requests, establish criteria for filters, etc. through suitable user interfaces of computing devices. In other embodiments, such user interfaces may not be used and/or needed to perform all of some of such actions (e.g., computers may perform such actions without user interfaces, etc.).

In summary, the present invention includes an electronic trading marketplace that generates liquidity, at least in part, by receiving order information directly from the databases of OMS systems at trading institutions. Since orders are extracted from the OMS databases automatically, and information about executed orders is inserted into the databases automatically, the OMS databases "see" the marketplace as "just another market intermediary." Moreover, traders are able to conduct trades in the electronic marketplace without any duplicative manual efforts.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The following should be interpreted as embodiments, and not as claims:

A. A computer-implemented method comprising:
  receiving a non-binding indication of an order in a database of an order management system;
  determining if a currently matching counter party for the order exists by searching a listing of active orders of an electronic marketplace; and
  if no currently matching counter party is determined to exist, determining if an previously matching counter party exists by querying at least one potential counter party who is associated with a matching inactive order.

A.1. The method of claim A, in which the matching inactive order includes an order that was previously fulfilled.

A.2. The method of claim A, in which the matching inactive order includes an order that was previously unfulfilled.

A.2.1. The method of claim A, in which the matching inactive order includes an expired order.

A.3. The method of claim A, in which the listing of active orders includes a plurality of orders received from a plurality of potential counter parties.

A.3.1. The method of claim A.3, in which the plurality of active orders includes active orders in respective databases of respective order management systems of the plurality of potential counter parties.

A.4. The method of claim A, further comprising: determining that an active order has become inactive; and storing information about the now inactive order that may be used to identify the at least one potential counter party.

B. A computer-implemented method comprising:
  accessing, by an electronic marketplace, records of open orders in a database of an order management system;

determining that at least one of the open orders from the database of the order management system has been, at least partly, fulfilled;

in response to determining that the at least one of the open order has been, at least partly, fulfilled, providing an indication of at least one of a complementary service and a complementary product available through the marketplace.

B.1. The method of claim B, in which the at least one of the complementary service and the complementary product includes a hedging opportunity.

B.2. The method of claim B, in which the at least one of the complementary service and the complementary product includes a money contract.

B.2.1. the method of claim B.2, in which the money contract involves a first currency native to a trading institution associated with the at least one of the open orders and a second currency with which the at least one of the open orders is associated.

B.2.2. The method of claim B.2, in which the money contract is offered by an operator of the marketplace.

B.2.3. The method of claim B.2, in which the money contract is available from a participant of the marketplace B.3. The method of claim B, in which the at least one of the complementary service and the complementary product includes a futures contract related to the at least one of the open orders.

B.3.1. The method of claim B.3, in which the futures contract is offered by at least one of operator of the marketplace and a participant of the marketplace.

B.4. The method of claim B, in which the at least one of the complementary service and the complementary product is available through a second electronic marketplace.

B.5. The method of claim B, further comprising determining the at least one of the complementary service and the complementary product based on a history of previous orders.

C. A computer-implemented method comprising:

receiving by an electronic marketplace, an indication of a record of an order in a database of an order management system;

determining that the electronic marketplace includes no matching counter parties for the order; and providing an indication of an alternative trade based, at least in part, on a characteristic of the order.

C.1. The method of claim C.1, in which the alternative trade involves an order with a desired characteristic in common with the order.

C.1.1. The method of claim C.1, in which the desired characteristic includes at least one of an industry, a market capitalization, a geographic region, a risk level, a profit to loss ratio, a volume of trades, a profit level, a sales level, a cash on hand amount, and an analyst recommendation.

C.2. The method of claim C, in which the alternative trade includes a trade of a derivative based at least in part on a security underlying the order.

C.3. The method of claim C, further comprising: receiving an indication of a trading strategy, and in which the alternative trade fulfills a part of the trading strategy embodied by the order in the trading strategy.

C.4. The method of claim C, further comprising: receiving an indication of a reason for the order being placed, and in which the alternative trade fulfills at least part of the reason.

C.5. The method of claim C, in which the alternative trade is available through a second electronic marketplace.

C.6. The method of claim C, further comprising determining the alternative trade based on a history of previous orders.

D. A computer system comprising:
a microprocessor operable to:
receive a first order from a first market participant,
receive a second order from a second market participant, in which the second order is received from an OMS module of the second market participant,
determine that the first order matches the second order,
transmit a request for acceptance of the first order to the second market participant, and
only if the second market participant accepts the request, facilitate an execution of a trade fulfilling at least part of the first order and at least part of the second order, in which facilitating the execution includes facilitating the execution without a negotiation between the first market participant and the second market participant about a price of the trade and without a negotiation between the first market participant and the second market participant about a quantity of financial instruments in the trade.

D.1. The system of claim D, in which the OMS module includes at least one of an order management system, and a system configured to interface an order management system with a marketplace D.2. The system of claim D, in which the microprocessor is further operable to suppress, from the first market participant, evidence of the determination that the first order matches the second order, at least until the facilitation of the execution of the trade.

D.2.1. The system of claim D.2, in which suppressing evidence includes at least one of: performing at least some actions as if the determination were not made, transmitting misleading information regarding the determination, transmitting no information regarding the determination, and transmitting an imitation request for acceptance if the determination were not made.

D.3. The system of claim D, in which the first order includes an indication of a price range in which the first market participant agrees to execution of the trade.

D.4. The system of claim D, in which the execution of the trade includes an execution at a price determined by at least one of a midpoint pricing model and a volume weighted average pricing model.

D.5. The system of claim D, in which the request includes a request that is available for a limited amount of time, in which the second market participant may only accept the request during the limited amount of time.

D.6. The system of claim D, in which receiving the first order from the first market participant includes receiving the first order from an electronic device operated by the first market participant.

D.6.1. The system of claim D.6, in which the electronic device is configured to allow the first market participant to enter information defining the first order through a user interface.

D.7. The system of claim D, in which receiving the second order from the OMS module includes receiving the second order from the OMS module through a communication network.

D.8. The system of claim D, in which receiving the first order from the first market participant includes receiving the first order from an OMS module of the first market participant.

D.9. The system of claim D, in which the first order matches the second order if the first order and the second order are for opposite sides of a trade for the same financial instrument.

D.9.1. The system of claim D.9, in which the first order includes an order for at least one of a purchase and a sale of a first quantity of the financial instrument, and the second order includes an order for a respective at least one of a sale and a purchase of a second quantity of the financial instrument.

D.10. The system of claim D, in which the microprocessor is part of a marketplace.

D.11. The system of claim D, in which the first order identifies a financial instrument to be traded, a first quantity of the financial instrument to be traded, and a side of a trade of the financial instrument, and in which the second order identifies the financial instrument to be traded, a second quantity of the financial instrument to be traded, and an opposite side of the trade of the financial instrument.

D.12. The system of claim D, in which facilitating execution includes at least one of: executing the trade, beginning a negotiation between the first market participant and the second market participant that does not involve the price of the trade and does not involve the quantity of financial instruments in the trade, and transmitting information about the trade to a third party to execute the trade.

E. A computer system comprising:
a microprocessor operable to:
accept an indication of one or more criteria to use for filtering orders directed to a first market participant, in which the first market participant is associated with a plurality of first orders in an OMS,
accept a second order from a second market participant, in which the second order matches at least one first order of the plurality of first orders,
determine if the second order meets the one or more criteria,
only if the second order meets the one or more criteria, direct a request for acceptance of the second order to the first market participant, and
only if the first market participant accepts the request, facilitate an execution of a trade fulfilling at least part of the at least one first order and at least part of the second order, in which facilitating the execution includes facilitating the execution without a negotiation between the first market participant and the second market participant about a price of the trade and without a negotiation between the first market participant and the second market participant about a quantity of financial instruments in the trade.

E.1. The system of claim E, in which the microprocessor is further operable to suppress, from the second market participant, evidence of the one or more criteria.

E.1.1. The system of claim E.1, in which suppressing evidence includes at least one of: performing at least some actions as if the indication of the one or more criteria were not received, transmitting misleading information regarding the one or more criteria, transmitting no information regarding the receipt of the indication of the one or more criteria, and transmitting an imitation request for acceptance if the second order does not match the criteria.

E.2. The system of claim E, in which the microprocessor is further operable to suppress, from the second market participant, evidence of the determination of whether the second order meets the one or more criteria.

E.2.1. The system of claim E.2, in which suppressing evidence includes at least one of: performing at least one action as if the determination was not made, transmitting misleading information regarding the determination, transmitting no information regarding the determination, and transmitting an imitation request if a third order does not match the criteria.

E.3. The system of claim E, in which the second order includes an indication of a price range in which the second market participant agrees to execution of the trade.

E.4. The system of claim E, in which the execution of the trade includes an execution at a price determined by at least one of a midpoint pricing model and a volume weighted average pricing model.

E.5. The system of claim E, in which the request includes a request that is available for a limited amount of time, in which the first market participant may only accept the request during the limited amount of time.

E.6. The system of claim E, in which the first order matches the second order if the at least one first order and the second order are for opposite sides of a trade for the same financial instrument.

E.6.1. The system of claim E.6, in which the first order includes an order for at least one of a purchase and a sale of a first quantity of the financial instrument, and the second order includes an order for a respective at least one of a sale and a purchase of a second quantity of the financial instrument.

E.7. The system of claim E, in which the one or more criteria includes a time-related criteria.

E.8. The system of claim E, in which the one or more criteria includes at least one of a quantity-related criteria, an identification criteria, a price-related criteria, a type-related criteria, and an industry-related criteria.

E.9. The system of claim E, in which the microprocessor is part of a marketplace.

E.10. The system of claim E, in which second order is submitted through a user interface of an electronic device.

E.11. The system of claim E, in which the first order identifies a financial instrument to be traded, a first quantity of the financial instrument to be traded, and a side of a trade of the financial instrument, and in which the second order identifies the financial instrument to be traded, a second quantity of the financial instrument to be traded, and an opposite side of the trade of the financial instrument.

E.12. The system of claim E, in which facilitating execution includes at least one of: executing the trade, beginning a negotiation between the first market participant and the second market participant that does not involve the price of the trade and does not involve the quantity of financial instruments in the trade, and transmitting information about the trade to a third party to execute the trade.

F. A computer system comprising:
a microprocessor operable to:
receive a first order from a first market participant,
receive a second order from a second market participant, in which the second order is received from an OMS module of the second market participant, and in which the second order matches the first order,
only if the second market participant accepts a request for acceptance of the first order, facilitate an execution of a trade fulfilling at least part of the first order and at least part of the second order, in which facilitating the execution includes facilitating the execution without a negotiation between the first market participant and the second market participant about a price of the trade and without a negotiation between the first market participant and the second market participant about a quantity of financial instruments in the trade,
charge a first fee to the first market participant, and
provide at least a portion of the first fee to the second market participant.

F.1. The system of claim F, in which the first market participant is a sell-side participant and the second market participant is a buy-side participant.

F.2. The system of claim F, in which the microprocessor is further operable to charge a second fee to the second market participant, and in which providing the at least the portion of the first fee to the second participant includes paying at least a portion of the second fee.

F.3. The system of claim F, in which providing the at least the portion of the first fee to the second market participant includes crediting an account of the second market participant.

F.4. The system of claim F, in which the first order matches the second order if the first order and the second order are for opposite sides of a trade for the same financial instrument.

F.4.1. The system of claim F.4, in which the first order includes an order for at least one of a purchase and a sale of a first quantity of the financial instrument, and the second order includes an order for a respective at least one of a sale and a purchase of a second quantity of the financial instrument.

F.5. The system of claim F, in which the first order includes an indication of a price range in which the first market participant agrees to execution of the trade.

F.6. The system of claim F, in which the execution of the trade includes an execution at a price determined by at least one of a midpoint pricing model and a volume weighted average pricing model.

F.7. The system of claim F, in which the request includes a request that is available for a limited amount of time, in which the second market participant may only accept the request during the limited amount of time.

F.8. The system of claim F, in which receiving the first order from the first market participant includes receiving the first order from an electronic device operated by the first market participant.

F.8.1. The system of claim F.8, in which the electronic device is configured to allow the first market participant to enter information defining the first order through a user interface.

F.9. The system of claim F, in which receiving the second order from the OMS module includes receiving the second order from the OMS module through a communication network.

F.10. The system of claim F, in which receiving the first order from the first market participant includes receiving the first order from an OMS module of the first market participant.

F.11. The system of claim F, in which the microprocessor is part of a marketplace.

F.12. The system of claim F, in which the first order identifies a financial instrument to be traded, a first quantity of the financial instrument to be traded, and a side of a trade of the financial instrument, and in which the second order identifies the financial instrument to be traded, a second quantity of the financial instrument to be traded, and an opposite side of the trade of the financial instrument.

F.13. The system of claim F, in which facilitating execution includes at least one of: executing the trade, beginning a negotiation between the first market participant and the second market participant that does not involve the price of the trade and does not involve the quantity of financial instruments in the trade, and transmitting information about the trade to a third party to execute the trade.

What is claimed is:

1. An apparatus comprising:
   a computing device; and
   a non-transitory medium having stored thereon a plurality of instructions that when executed by the computing device cause the apparatus to:
   receive an indication of an order stored in an order management system of a trading firm;
   determine that no active matching counter order for the order is available for executing a trade involving the order;
   in response to determining that no active matching counter order is accessible, determine that a previously active matching counter order to the order existed at a time prior to receiving the indication of the order; and
   in response to determining that the previously active matching order existed, query a party related to the previously active matching counter order to find a counter party for the trade.

2. The apparatus of claim 1, in which the previously active matching counter order includes at least a part that was previously fulfilled.

3. The apparatus of claim 1, in which the previously active matching counter order includes at least a part that was previously unfulfilled.

4. The apparatus of claim 1, in which the previously active matching counter order includes at least a part that expired.

5. The apparatus of claim 1, in which determining that no currently active matching counter order for the first order is accessible includes searching a set of currently active orders.

6. The apparatus of claim 5, in which the set of currently active orders includes active orders in respective databases of respective order management systems of the plurality of potential counter parties.

7. The apparatus of claim 1, in which the party includes at least one of a party that submitted the previously active counter order and a party that entered into a trade involving the previously active counter order.

8. The apparatus of claim 1, in which the order is for a financial instrument that has historically been relatively illiquid.

9. The apparatus of claim 1, in which the previously active counter order includes a passive side of a prior trade.

10. The apparatus of claim 1, in which the previously active counter order is determined based on a history of previous orders maintained by an exchange.

11. The apparatus of claim 1, in which the order is for an underlying financial instrument and the trade includes a trade involving an alternative underlying financial instrument.

12. The apparatus of claim 11, in which the alternative underlying financial instrument includes a characteristic that is common with the underlying financial instrument.

13. The apparatus of claim 11, in which the trade includes a trade of a derivative based at least in part on the underlying financial instrument.

14. The apparatus of claim 11, in which the plurality of instructions, when executed by the computing device cause the apparatus to: receive an indication of a trading strategy, in which the trade fulfills a part of the trading strategy embodied by the order in the trading strategy, and in which the alternative financial instrument is determined so that the trade fulfilling the part of the trading strategy.

15. The apparatus of claim 1, in which querying the party includes transmitting a query to a remote electronic marketplace.

16. The apparatus of claim 1, in which the plurality of instructions, when executed by the computing device cause the apparatus to: track the previously active matching counter order.

17. The apparatus of claim 16, in which a term of tracking is based on a liquidity of an underlying financial instrument associated with the previously active matching counter order.

18. The apparatus of claim 1, in which the plurality of instructions, when executed by the computing device cause the apparatus to:
  receive, from the party in response to the querying, a second order;
  in response to receiving the second order, transmitting to the trading firm, a request for acceptance of a trade fulfilling at least part of the second order and at least part of the order;
  receiving the acceptance by the trading firm; and
  in response to receiving the acceptance, facilitating execution of the trade.

19. The apparatus of claim 18, in which the plurality of instructions, when executed by the computing device cause the apparatus to:
  prevent a negotiation between the trading firm and the party regarding the trade; and
  suppress evidence of the acceptance until after the execution.

20. The apparatus of claim 1, in which the trade includes a trade fulfilling at least part of the order.

21. The apparatus of claim 1, in which the plurality of instructions, when executed by the computing device cause the apparatus to:
  access, to receive the indication of the order, at least one message reflecting open orders received from an order management system, wherein the order management system is associated with the trading firm and wherein the order management system is coupled to at least one workstation utilized by the trading firm, wherein the order management system stores data in at least the following fields:
  (a) a security name, symbol or identifier,
  (b) transaction type,
  (c) total order size,
  (d) quantity of the security placed elsewhere, and
  (e) quantity of the security executed.

22. The apparatus of claim 1, in which the previously active matching counter order includes at least a part that was at least one of a previously fulfilled, previously unfulfilled, and expired order;
  in which determining that no currently active matching counter order for the first order is accessible includes searching a set of currently active orders;
  in which the set of currently active orders includes active orders in respective databases of respective order management systems of the plurality of potential counter parties;
  in which the party includes at least one of a party that submitted the previously active counter order and a party that entered into a trade involving the previously active counter order;
  in which the order is for a financial instrument that has historically been relatively illiquid;
  in which the previously active counter order includes a passive side of a prior trade;
  in which the previously active counter order is determined based on a history of previous orders maintained by an exchange;
  in which the order is for an underlying financial instrument and the trade includes a trade involving an alternative underlying financial instrument;
  in which the trade includes a trade of a derivative based at least in part on the underlying financial instrument;
  in which the plurality of instructions, when executed by the computing device cause the apparatus to: receive an indication of a trading strategy, in which the trade fulfills a part of the trading strategy embodied by the order in the trading strategy, and in which the alternative financial instrument is determined so that the trade fulfilling the part of the trading strategy;
  in which querying the party includes transmitting a query to a remote electronic marketplace;
  in which the plurality of instructions, when executed by the computing device cause the apparatus to: track the previously active matching counter order;
  in which a term of tracking is based on a liquidity of an underlying financial instrument associated with the previously active matching counter order;
  in which the plurality of instructions, when executed by the computing device cause the apparatus to:
  receive, from the party in response to the querying, a second order;
  in response to receiving the second order, transmitting to the trading firm, a request for acceptance of a trade fulfilling at least part of the second order and at least part of the order;
  receiving the acceptance by the trading firm; and
  in response to receiving the acceptance, facilitating execution of the trade;
in which the plurality of instructions, when executed by the computing device cause the apparatus to:
  prevent a negotiation between the trading firm and the party regarding the trade; and
  suppress evidence of the acceptance until after the execution;
in which the trade includes a trade fulfilling at least part of the order; and
in which the plurality of instructions, when executed by the computing device cause the apparatus to:
  access, to receive the indication of the order, at least one message reflecting open orders received from an order management system, wherein the order management system is associated with the trading firm and wherein the order management system is coupled to at least one workstation utilized by the trading firm, wherein the order management system stores data in at least the following fields:
  (a) a security name, symbol or identifier,
  (b) transaction type,
  (c) total order size,
  (d) quantity of the security placed elsewhere, and
  (e) quantity of the security executed.

23. A method comprising:
  receiving, by an electronic marketplace, an indication of an order stored in an order management system of a trading firm;
  determining, by the electronic marketplace, that no active matching counter order for the order is available for executing a trade involving the order;
  in response to determining that no active matching counter order is accessible, determining, by the electronic marketplace, that a previously active matching counter order to the order existed at a time prior to receiving the indication of the order; and
  in response to determining that the previously active matching order existed, querying, by the electronic marketplace, a party related to the previously active matching counter order to find a counter party for the trade.

* * * * *